United States Patent
Ganapathiappan

(10) Patent No.: US 7,569,650 B2
(45) Date of Patent: Aug. 4, 2009

(54) COMPOSITIONS AND METHODS FOR PRODUCING LATEXES CONTAINING URETHANES

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 11/879,821

(22) Filed: Jul. 17, 2007

(65) Prior Publication Data

US 2009/0020036 A1    Jan. 22, 2009

(51) Int. Cl.
*C08F 26/02* (2006.01)

(52) U.S. Cl. .......................... 526/301; 526/80; 526/328; 523/160

(58) Field of Classification Search .................. 523/160
See application file for complete search history.

(56) References Cited

U.S. PATENT DOCUMENTS

| | | | |
|---|---|---|---|
| 4,956,252 A * | 9/1990 | Fryd et al. .................. | 430/138 |
| 5,814,685 A * | 9/1998 | Satake et al. ................. | 523/201 |
| 5,852,111 A | 12/1998 | Watanabe et al. | |
| 6,848,777 B2 | 2/2005 | Chen et al. | |
| 6,893,731 B2 * | 5/2005 | Kausch ........................ | 428/483 |
| 6,921,562 B2 | 7/2005 | Yip et al. | |
| 6,945,647 B2 | 9/2005 | Yip et al. | |
| 7,059,714 B2 | 6/2006 | Kaeding et al. | |
| 2005/0004261 A1 * | 1/2005 | Yatake ........................ | 523/160 |
| 2005/0007432 A1 | 1/2005 | Kanaya et al. | |
| 2005/0137278 A1 * | 6/2005 | Fromm et al. ................ | 522/100 |
| 2006/0205841 A1 | 9/2006 | Furuno et al. | |
| 2006/0240198 A1 * | 10/2006 | Tanikawa et al. ............ | 428/1.53 |

FOREIGN PATENT DOCUMENTS

| EP | 1 164 150 | 12/2001 |
|---|---|---|
| EP | 1 571 184 | 9/2005 |

* cited by examiner

*Primary Examiner*—David Wu
*Assistant Examiner*—Vu Nguyen

(57) ABSTRACT

A latex particle for use in ink-jet inks can comprise a latex polymer core and a latex polymer shell such that the latex polymer shell has a $T_g$ that is at least 10° C. greater than the $T_g$ of the latex polymer core. The latex polymer core can comprise at least one polymerized core monomer. The latex polymer shell can comprise at least two polymerized shell monomers including a urethane acrylate monomer.

34 Claims, No Drawings

COMPOSITIONS AND METHODS FOR PRODUCING LATEXES CONTAINING URETHANES

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity to accommodate high frequency jetting and firing chamber refill processes common to ink-jet architecture.

Traditionally, dyes have been used as colorants in thermal ink-jet inks due to their vibrant colors, low cost, and compatibility with thermal ink-jet pens. However, images produced by dye-based inks tend to lack durability, i.e. they exhibit low water fastness, smear fastness, and light fastness. Replacing dyes with pigments as colorants can improve some of these properties, but the presence of pigments can result in images that have a surface that can suffer from lessened smear fastness. Polymers or latexes may be used in ink-jet inks to improve image durability. However, when present as additives, latexes can contribute to increased viscosity due to the increased number of particles suspended in the ink. Additionally, latexes can hamper printing reliability as the increased viscosity increases clogging and misdirected print drops. As such, ink-jet applications would benefit from latexes that improve durability but do not hamper print reliability.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a urethane linkage" includes reference to one or more of such urethane linkages.

As used herein, "liquid vehicle," "liquid medium," or "carrier" refers to the fluid in which the latex particles of the present invention are dispersed to form a latex dispersion. Often, the fluid of the dispersion can be used in conjunction with a pigment or dye as an ink-jet ink, and can be incorporated with other solvents, surfactants, etc. Many liquid vehicles and vehicle components are known in the art. Typical liquid vehicles can include a mixture of a variety of different agents, such as surfactants, co-solvents, buffers, biocides, sequestering agents, viscosity modifiers, and/or water. Additionally, the terms "aqueous liquid vehicle" or "aqueous vehicle" refer to liquid vehicles that contain water as a solvent. Such vehicles may also contain additional co-solvents and/or other additives.

As used herein, "pigment" generally includes pigment colorants, magnetic particles, aluminas, silicas, and/or other ceramics or organo-metallics, whether or not such particulates impart color.

As used herein, the term "acrylate functional group" refers to compounds having the following structure:

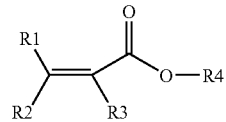

where R1-R4 can be a single constituent, e.g., hydrogen, or include an aliphatic or aromatic group, including substituted groups.

As used herein, the term "urethane linkage" refers to any compound having the following structure:

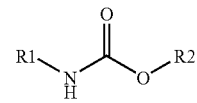

where R1 and R2 can represent any organic compound. Thus, a "urethane" or "polyurethane" includes polymers that have urethane linkages, including polymers not formed by traditional isocyanate and alcohols. When describing monomers, "urethane" indicates that the monomer has a urethane linkage. Additionally, "non-urethanes" can describe polymers or monomers free of urethane linkages. In accordance with embodiments of the present invention, the urethane linkages present within a polymer are typically present primarily along pendent groups, rather than along the backbone.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop latex particles containing urethane linkages on the surface of the particles. In accordance with this, the present invention is drawn to compositions and methods of making a latex particle comprising a polymer core and a urethane polymer shell. It is noted that when discussing a latex particle or a method of formulating such a particle, each of these discussions can be considered applicable to each of these embodiments, whether or not they are explicitly discussed in the context of that embodiment. Thus, for example, in discussing the core monomers present in a latex particle, those monomers can also be used in a method for making such latex particles, and vice versa.

A latex particle for use in ink-jet inks can comprise a latex polymer core and a latex polymer shell such that the latex polymer shell has a $T_g$ that is at least 10° C. greater than the $T_g$ of the latex polymer core. The latex polymer core can comprise at least one polymerized core monomer. The latex polymer shell can comprise at least two polymerized shell monomers including a urethane acrylate monomer.

In another embodiment, a method of forming latex particulates for use in ink-jet inks can comprise the steps of a) preparing a monomer emulsion including an aqueous phase and an organic monomer phase having at least one core monomer; b) polymerizing the core monomer to form a latex polymer core dispersed in the aqueous phase; and c) copolymerizing at least two shell monomers including a urethane acrylate monomer to form a latex polymer shell. The latex polymer shell can have a $T_g$ that is at least 10° C. greater than a $T_g$ of the latex polymer core.

Generally, the core monomers of the latex particle can be urethane monomers, non-urethane monomers, or a mixture thereof. Core monomers suitable for forming latex particles can be organic monomers as are well known in the art. Suitable non-urethane monomers include, without limitation, styrene, p-methyl styrene, methyl acrylate, methyl methacrylate, isobutyl methacrylate, hexyl acrylate, hexyl methacrylate, 2-ethylhexyl acrylate, 2-ethylhexyl methacrylate, octyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, and mixtures thereof. Additionally, other suitable monomers are included in U.S. Pat. No. 6,057,384, which is incorporated herein by reference in its entirety. In one embodiment, the core monomer can be a urethane acrylate monomer, as described herein. As such, the core can have urethane linkages. Alternately, in another embodiment, the core can be substantially free of urethane linkages.

Typically, the core monomers can be selected such that, after polymerization, the polymerized core has a film-forming $T_g$. As such, the polymerized core can have a $T_g$ of about 0° C. to about 75° C. In one embodiment, the polymerized core can have a $T_g$ of about 0° C. to about 50° C. In another embodiment, the polymerized core can have a $T_g$ of about 10° C. to about 40° C.

Generally, the latex polymer shell comprises at least two polymerized shell monomers including a urethane acrylate monomer. As such, the present invention contemplates the use of a polyurethane, i.e. the polyurethane can be comprised of monomers containing a urethane linkage but is polymerized through a free radical polymerization typical of acrylates, such as the urethane acrylates described herein. In other words, the polyurethanes can be polymerized from monomers that do not use isocyanate or alcohol groups for the purpose of forming urethane linkages, but may contain such groups for other functional purposes. For example, an alcohol group may be present in a urethane acrylate monomer for cross-linking purposes, for further substitution purposes, or to obtain desired surface characteristics. As such, the latexes described herein can contain a urethane linkage within a pendent group as opposed to traditional urethanes that have a urethane linkage along the backbone of the polymer chain.

In one embodiment, the shell monomers can include urethane acrylate monomers. In another embodiment, the shell monomers can include aliphatic or aromatic urethane acrylates. Generally, urethane acrylates include any monomer having a urethane linkage and an acrylate functional group. For example, such urethane acrylates, including a wide range of molecular weights, are commercially available from Sartomer, including aliphatic urethane acrylates such as CN9005, CN9006, CN9007, CN9178, CN9178, CN996, CN968, CN983B88, CN963A80, CN945B85, etc.; and aromatic urethane acrylates such as CN2901, CN9202, CN9783, CN994, CN999, CN3210, CN975, CN972, CN978, CN970A60, CN970E60, CN970H75, CN977C70, CN971J75, etc. In one embodiment, the urethane acrylate monomers used in the present invention can have the following structure:

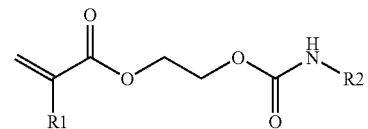

where R1 and R2 can be hydrogen, alkyl or aryl, including branched, linear, substituted, or unsubstituted groups thereof. In one embodiment, the alkyl group can be from $C_1$ to $C_{10}$, for example.

In addition to the shell monomers having urethane linkages, i.e. urethane acrylates, the polymer shell can contain other non-urethane monomers, for example, such as the non-urethane core monomers as described herein. As such, the latex particle may have core monomers that are the same as some of the shell monomers. In one embodiment, one of the at least two shell monomers (or a third monomer) can be the same as the at least one core monomer. As such, the core and the shell can contain the same urethane acrylate monomer. In another embodiment, the at least two shell monomers can be different than the at least one core monomer.

Typically, the shell monomer can be selected such that, after polymerization, the polymerized shell has a higher $T_g$ than that of the polymerized core such that the latex has improved durability, i.e. shear stability. As such, the polymerized shell can have a $T_g$ of about 75° C. to about 150° C. In one embodiment, the polymerized shell can have a $T_g$ greater than about 100° C. In another embodiment, the polymerized shell can have a $T_g$ greater than about 120° C.

When the latex particles are added to a liquid vehicle, a latex dispersion is formed, which can be stabilized through incorporation of a monomer or monomers that promote latex surface charge on the surface of the polymer shell. Such monomers are represented by acrylic acid, methacrylic acid, vinyl benzoic acid, maleic acid, itaconic acid, or methacryloyloxyethylsuccinate. The charge forming monomers typically comprise from 0.5 wt % to 20 wt %, preferably 3 wt % to 10 wt %, of the latex particle and are typically neutralized after latex polymerization to form salts. Such salts may be formed through the reaction of a monomer carboxylic acid with potassium hydroxide or other similar salting agent.

Latex particle dispersion stability is also influenced by particle density, which influences the ability of particles to settle within ink-jet architecture microchannels. In the present invention, the core monomers, shell monomers, pigment, and monomer/polymer-pigment ratio can be selected to collectively produce particles having a density that is often greater than 1.0 g/cm$^3$. Stability of higher density particles can be achieved by reducing the size and increasing the surface charge of the particles.

Steric stabilizers, such as surfactants, are generally also used to control the latex particle size during polymerization and can also be selected to provide additional particle dispersion stability. Such stabilizers are often adhered to the latex particle surface to minimize thermal shearing under thermal architecture firing conditions. This can be accomplished by matching the hydrophobicity of the latex monomer set and surfactant, and/or through incorporation of a reactive surfactant.

Additionally, the surface dielectric constant of the latex particles of the present invention can be from 2.0 to 3.0, and can be below 2.8 in one embodiment. This property can be useful to sufficiently anchor surfactants against thermal shearing in thermal ink-jet architecture. Stabilization can also be facilitated by the incorporation of 0.5 wt % to 15 wt %, or from 0.5 wt % to 5 wt %, and often from 1 wt % to 2 wt %, of addition of a multimer, preferably a dimer, capable of forming crosslinks between polymer chains in the latex particle. Such a multimer is represented by ethylene glycol dimethacrylate, for example. These narrow ranges of crosslinking have been found beneficial to maintain the integrity of the latex under the high thermal shear conditions of thermal ink jetting while not adversely impacting its room temperature film-forming properties. Such crosslinking is helpful for latexes having glass transition temperatures below 75° C. Room temperature film-forming latexes require glass transition temperatures in the range of 0° C. to 75° C., preferably 0° C. to 50° C., and more preferably 10° C. to 40° C. Higher glass transition temperature ranges may be selected when latex coagulation is accomplished at a higher than ambient temperature, for example by heated fuser roller.

In one embodiment, the latex polymer core can further comprise a pigment. The pigment can be encapsulated by the core monomers. To encapsulate the pigment, the core monomers can be polymerized in the presence of the pigment such that the pigment is at least partially enclosed by the polymerized core monomers.

The thickness of the latex particle can be any suitable thickness, but is typically about 100 nm to about 300 nm. In one embodiment, the latex particle can be about 200 nm. The latex shell can be from about 10 nm to about 30 nm. In one embodiment, the latex shell can be about 20 nm. The latex particle can have a polymer core in a range of from about 15 wt % to about 75 wt % with a polymer shell in a range of from about 25 wt % to about 85 wt %. In another embodiment, the polymer core can be about 50 wt % to about 75 wt % with a polymer shell from about 25 wt % to about 50 wt %. In yet another embodiment, the polymer core can be about 60 wt % with a polymer shell of about 40 wt %.

As previously discussed, the polymer shell can incorporate monomers having urethane linkages and other non-urethane monomers. As such, the polymer shell can contain about 10 wt % to about 30 wt % of monomers having urethane linkages. In one embodiment, the polymer shell can contain about 20 wt % of monomers having urethane linkages. Additionally, rather than a two-layered latex structure, a three-layered latex pigment structure can be prepared that includes a pigment, a core (of the core-shell latex) encapsulating the pigment, and the shell (of the core-shell latex) attached to the core.

With these parameters in place regarding some of the possible latex particles that can be formed, a discussion of dispersion fluids, e.g., inks, etc., is useful to exemplify how these latex particles can be implemented for use in accordance with an embodiment of the present invention. As mentioned, the latex particles can be added to a carrier, e.g., an aqueous liquid vehicle, according to the methods described above. In a more specific embodiment, the latexes described herein can be added to a liquid vehicle with a pigment to form an ink-jet ink. Because the present invention provides latex particles having improved shear stability, inks containing these particles exhibit improved durability properties associated with these latexes. As the latexes of the present invention have improved shear properties, traditional inks using these latexes require up to 75% less latex in order to achieve the durability provided by traditional latexes. Additionally, the latexes described herein can be added to a liquid vehicle to form an ink-jet coating composition. One skilled in the art will recognize that the latexes provided herein can be used with various ink-jet inks and ink-jet coating compositions as known in the art.

Typical liquid vehicle formulation that can be used with the latexes and inks described herein can include water, and optionally, one or more co-solvents present in total at from 0 wt % to 30 wt %, depending on the jetting architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the liquid vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

In accordance with embodiments of the present invention, the latex particles of the present invention can be present in a latex dispersion at from 1 wt % to 30 wt %. If a pigment is added to the latex dispersion to form an ink-jet ink, the latex particles of the present invention can be present in the ink-jet ink at from 1 wt % to 10 wt %.

EXAMPLES

The following examples illustrate the embodiments of the invention that are presently known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be useful embodiments of the invention.

Example 1

Preparation of a Latex Particle with Urethane Acrylate Shell

In a round-bottom flask, 76 g of styrene, 276 g of hexyl methacrylate, 24 g of methacrylic acid, 4 g of ethylene glycol dimethacrylate, 1.6 g of isooctylthio glycolate as a chain transfer agent, and 33.28 g of 30% Rhodafac RS 710 as an emulsifying agent are mixed in 136 ml of water forming an emulsion. An initiator solution is prepared by adding 1.39 g of potassium persulfate to 160 ml of water. A hot water solution is prepared by adding 32 ml of the initiator solution to 1160 ml of water preheated to 90° C. Simultaneous addition of the remaining initiator solution with the emulsion is added to the hot water solution over a period of 32 minutes to form a reaction mixture. After about 60% of the emulsion addition, another component, aliphatic urethane acrylate CN968 from Sartomer, is added to the reaction mixture for the incorporation of urethane linkages on the surface of the latex particle. The reaction mixture is maintained at 90° C. for 1.75 hours and then cooled to ambient temperature. The reaction mixture is then neutralized with 50% potassium hydroxide solution and filtered using 200 µm filter to obtain a latex with a rigid polymer shell containing urethane linkages.

Example 2

Preparation of a Latex Particle with a Urethane Acrylate Shell

In a round-bottom flask, 76 g of styrene, 276 g of hexyl methacrylate, 24 g of methacrylic acid, 4 g of ethylene glycol dimethacrylate, 1.6 g of isooctylthio glycolate as a chain transfer agent, and 33.28 g of 30% Rhodafac RS 710 as an emulsifying agent are mixed in 136 ml of water forming an emulsion. An initiator solution is prepared by adding 1.39 g of potassium persulfate to 160 ml of water. A hot water solution is prepared by adding 32 ml of the initiator solution to 1160 ml of water preheated to 90° C. Simultaneous addition of the remaining initiator solution with the emulsion is added to the hot water solution over a period of 2 hours at a temperature of 90° C. to form polymerized latex cores. After the formation of the latex cores, an aliphatic urethane acrylate (Sartomer CN968) and an aromatic urethane acrylate (Sartomer CN972) are added to the reaction mixture and subsequently polymerized at 90° C. for a further 2 hours forming a latex shell having urethane linkages. The reaction mixture is cooled to ambient temperature. The reaction mixture is then neutralized with 50% potassium hydroxide solution and filtered using 200 µm filter to obtain latex particles with a rigid polymer shell containing urethane linkages.

Example 3

Preparation of a Latex Particle with a Urethane Core and Shell

In a round-bottom flask, 76 g of styrene, 276 g of hexyl methacrylate, 24 g of methacrylic acid, 4 g of ethylene glycol dimethacrylate, 20 g of an aliphatic urethane acrylate CN968 from Sartomer, 1.6 g of isooctylthio glycolate as a chain transfer agent, and 33.28 g of 30% Rhodafac RS 710 as an emulsifying agent are mixed in 136 ml of water forming an emulsion. An initiator solution is prepared by adding 1.39 g of potassium persulfate to 160 ml of water. A hot water solution is prepared by adding 32 ml of the initiator solution to 1160 ml of water preheated to 90° C. Simultaneous addition of the remaining initiator solution with the emulsion is added to the hot water solution over a period of 2 hours at a temperature of 90° C. The reaction mixture is cooled to ambient temperature. The reaction mixture is then neutralized with 50% potassium hydroxide solution and filtered using 200 µm filter to obtain latex particles with a rigid polymer surface containing urethane linkages.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:
1. A latex particle for use in ink-jet inks, comprising:
a) a latex polymer core, said latex polymer core comprising at least one polymerized core monomer; and
b) a latex polymer shell, said latex polymer shell comprising at least two polymerized shell monomers including a urethane acrylate monomer;

wherein the latex polymer shell has a $T_g$ that is at least 10° C. greater than a $T_g$ of the latex polymer core, and wherein the urethane acrylate monomer has the following structure:

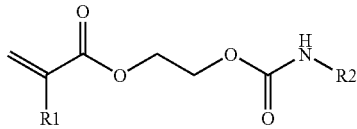

where R1 and R2 is independently hydrogen, branched or linear alkyl, or aryl, including substituted alkyl or aryl thereof.

2. The latex particle of claim 1, wherein the latex polymer core is substantially free of urethane linkages.

3. The latex particle of claim 1, wherein the at least one latex polymerized core monomer includes a urethane acrylate monomer.

4. The latex particle of claim 1, wherein the at least one polymerized core monomer is selected from the group of styrene, p-methyl styrene, methyl acrylate, methyl methacrylate, isobutyl methacrylate, hexyl acrylate, hexyl methacrylate, 2-ethylhexyl acrylate, 2-ethylhexyl methacrylate, octyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, benzyl methacrylate, tetrahydrofuranyl methacrylate, vinylbenzyl chloride, and mixtures thereof.

5. The latex particle of claim 1, wherein the latex polymer shell is crosslinked.

6. The latex particle of claim 1, wherein the latex polymer core has a $T_g$ of about 0° C. to about 75° C.

7. The latex particle of claim 1, wherein the latex polymer shell has a $T_g$ of about 75° C. to about 150° C.

8. The latex particle of claim 1, wherein the latex polymer shell contains about 10 wt % to about 30 wt % of polymer shell monomers having urethane linkages.

9. The latex particle of claim 1, wherein the latex particle has a size of about 100 nm to about 300 nm.

10. The latex particle of claim 1, wherein the latex polymer shell has a thickness of about 10 nm to about 30 nm.

11. An ink-jet ink, comprising a pigment, a liquid vehicle, and a latex particle of claim 1.

12. An ink-jet coating composition, comprising a liquid vehicle and a latex particle of claim 1.

13. A method of forming latex particulates for use in ink-jet inks, comprising:
a) preparing a monomer emulsion including an aqueous phase and an organic monomer phase which includes at least one core monomer;
b) polymerizing the at least one core monomer to form a latex polymer core dispersed in the aqueous phase; and
c) copolymerizing at least two shell monomers including a urethane acrylate monomer;
wherein the latex polymer shell has a $T_g$ that is at least 10° C. greater than a $T_g$ of the latex polymer core, and wherein the urethane acrylate monomer has the following structure:

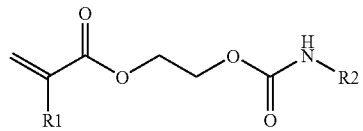

where R1 and R2 is independently hydrogen, branched or linear alkyl, or aryl, including substituted alkyl or aryl thereof.

14. The method of claim 13, wherein one of the at least two shell monomers or a third monomer of the latex polymer shell is the same as the at least one core monomer.

15. The method of claim 14, wherein the at least two shell monomers or a third monomer of the latex polymer shell that is the same as the at least one core monomer is a urethane acrylate monomer.

16. The method of claim 13, wherein the at least two shell monomers are different than the at least one core monomer.

17. The method of claim 13, wherein the latex polymer core has a $T_g$ of about 0° C. to about 75° C.

18. The method of claim 13, wherein the latex polymer shell has a $T_g$ of about 75° C. to about 150° C.

19. A latex particle for use in ink-jet inks, comprising:
a) a latex polymer core, said latex polymer core comprising at least one polymerized core monomer; and
b) a latex polymer shell, said latex polymer shell comprising at least two polymerized shell monomers including a urethane acrylate monomer;
wherein the latex polymer shell has a $T_g$ that is at least 10° C. greater than a $T_g$ of the latex polymer core, and wherein the at least one latex polymerized core monomer includes a urethane acrylate monomer.

20. The latex particle of claim 19, wherein the urethane acrylate monomer of the shell and/or core has the following structure:

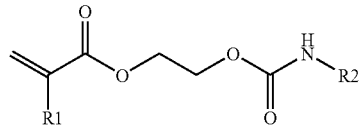

where R1 and R2 is independently hydrogen, branched or linear alkyl, or aryl, including substituted alkyl or aryl thereof.

21. The latex particle of claim 19, wherein the latex polymer core has a $T_g$ of about 0° C. to about 75° C. and the latex polymer shell has a $T_g$ of about 75° C. to about 150° C.

22. The latex particle of claim 19, wherein the latex polymer shell contains about 10 wt % to about 30 wt % of polymer shell monomers having urethane linkages.

23. A method of forming latex particulates for use in ink-jet inks, comprising:
b) preparing a monomer emulsion including an aqueous phase and an organic monomer phase which includes at least one core monomer;
b) polymerizing the at least one core monomer to form a latex polymer core dispersed in the aqueous phase; and
c) copolymerizing at least two shell monomers including a urethane acrylate monomer;
wherein the latex polymer shell has a $T_g$ that is at least 10° C. greater than a $T_g$ of the latex polymer core, and wherein the at least two shell monomers or a third monomer of the latex polymer shell that is the same as the at least one core monomer is a urethane acrylate monomer.

24. The method of claim 23, wherein the urethane acrylate monomer of the shell and/or core has the following structure:

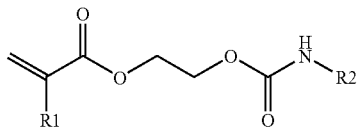

where R1 and R2 is independently hydrogen, branched or linear alkyl, or aryl, including substituted alkyl or aryl thereof.

25. The method of claim 23, wherein the latex polymer core has a $T_g$ of about 0° C. to about 75° C. and the latex polymer shell has a $T_g$ of about 75° C. to about 150° C.

26. The method of claim 23, wherein the latex polymer shell contains about 10 wt % to about 30 wt % of polymer shell monomers having urethane linkages.

27. A latex particle for use in ink-jet inks, comprising:
a) a latex polymer core, said latex polymer core comprising at least one polymerized core monomer; and
b) a latex polymer shell, said latex polymer shell comprising at least two polymerized shell monomers including a urethane acrylate monomer;
wherein the latex polymer shell has a $T_g$ that is at least 10° C. greater than a $T_g$ of the latex polymer core and wherein the latex polymer shell has a urethane linkage as a pendant group.

28. The latex particle of claim 27, wherein the urethane acrylate monomer of the shell has the following structure:

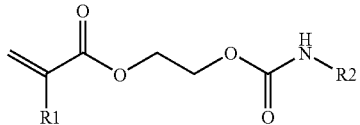

where R1 and R2 is independently hydrogen, branched or linear alkyl, or aryl, including substituted alkyl or aryl thereof.

29. The latex particle of claim 27, wherein the latex polymer core has a $T_g$ of about 0° C. to about 75° C. and the latex polymer shell has a $T_g$ of about 75° C. to about 150° C.

30. The latex particle of claim 27, wherein the latex polymer shell contains about 10 wt % to about 30 wt % of polymer shell monomers having urethane linkages.

31. A method of forming latex particulates for use in ink-jet inks, comprising:
a) preparing a monomer emulsion including an aqueous phase and an organic monomer phase which includes at least one core monomer;
b) polymerizing the at least one core monomer to form a latex polymer core dispersed in the aqueous phase; and
c) copolymerizing at least two shell monomers including a urethane acrylate monomer;
wherein the latex polymer shell has a $T_g$ that is at least 10° C. greater than a $T_g$ of the latex polymer core, and wherein the latex polymer shell has a urethane linkage as a pendant group.

32. The method of claim 31, wherein the urethane acrylate monomer of the shell has the following structure:

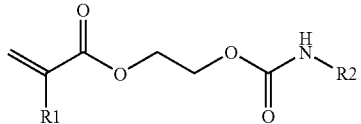

where R1 and R2 is independently hydrogen, branched or linear alkyl, or aryl, including substituted alkyl or aryl thereof.

33. The method of claim 31, wherein the latex polymer core has a $T_g$ of about 0° C. to about 75° C. and the latex polymer shell has a $T_g$ of about 75° C. to about 150° C.

34. The method of claim 31, wherein the latex polymer shell contains about 10 wt % to about 30 wt % of polymer shell monomers having urethane linkages.

* * * * *

UNITED STATES PATENT AND TRADEMARK OFFICE
CERTIFICATE OF CORRECTION

PATENT NO. : 7,569,650 B2  Page 1 of 1
APPLICATION NO. : 11/879821
DATED : August 4, 2009
INVENTOR(S) : Sivapackia Ganapathiappan It is certified that error appears in the above-identified patent and that said Letters Patent is hereby corrected as shown below:

In column 10, line 58, in Claim 23, delete "b)" and insert -- a) --, therefor.

Signed and Sealed this

Twentieth Day of April, 2010

David J. Kappos
*Director of the United States Patent and Trademark Office*